3,014,805
PROCESS FOR PREPARING AN EGG PRODUCT

Milton A. Mitz, Chicago, Ill., assignor, by mesne assignments, to Armour and Company, Chicago, Ill., a corporation of Delaware
No Drawing. Filed Aug. 29, 1960, Ser. No. 52,331
9 Claims. (Cl. 99—210)

This invention relates to the preparation of an egg product, and more particularly to the curing of an egg liquid in a process for obtaining a dry egg product.

This patent application is a continuation-in-part of my copending patent application Serial No. 538,770, filed October 5, 1955, now abandoned.

Dried egg products, such as spray-dried whole egg and egg white, deteriorate during storage at a rate increasing with increasing temperature. For example, less than six weeks storage at a temperature of 37° C. may produce marked changes in an egg powder. These changes may involve loss of solubility and beating power, lowering of pH, development of fluorescence and creaming, and a brownish color associated with the development of a burnt taste and odor. It is believed that these deteriorative changes in dried egg products are produced by the degradation of reducing sugars, such as glucose, contained in the egg. It has been found that fermentation of an egg liquid, prior to drying, with a yeast organism enhances the stability of the dry egg product. One method of curing the egg liquid is described in Josh, G., U.S. Patent No. 2,460,986, issued February 8, 1949, in which the preferred practice involves fermenting liquid egg white with Fleischman's bakers yeast causing, under aerobic conditions, the degradation of glucose to water and carbon dioxide, and dehydrating the fermented egg white to obtain a dry egg product. Although this process results in a dry egg product of enhanced stability, there is a tendency for such product to manifest a "yeasty" odor and flavor.

It is an object of this invention to provide a process for preparing dried egg products of improved physical and functional properties. Another object of this invention is to provide a process for preparing dry egg products in which "yeasty" flavor and odor have been significantly eliminated. A further object is to provide a process for preparing dry egg products which can be adapted to a continuous large scale manufacturing operation. Other objects and advantages will become apparent as the specification proceeds.

I have discovered that an egg liquid can be treated with the reducing sugar fermentative activity of a yeast organism to obtain a cured egg product in which "yeasty" flavor and odor have been significantly eliminated, providing the reducing sugar fermentative activity is substantially free from the viable yeast organism. By "reducing sugar" is meant a mono or dissacharide, such as glucose, galactose, sucrose, raffinose, maltose, melibiose and fructose, that reduces copper or silver salts in alkaline solutions, e.g. Fehling's solution. For the purposes of this invention, by "reducing sugar fermentative activity," I mean the enzyme system which degrades a reducing sugar to alcohol and carbon dioxide under anaerobic conditions, e.g. the glucolysis of glucose. For example, liquid egg white can be incubated under anaerobic conditions with an aqueous extract of a yeast organism, and the resulting cured egg white dehydrated to obtain a dry egg white product. This dry egg white product demonstrates improved beating properties and does not impart to cakes, cookies, frosting or other egg white-containing foods any significant "yeasty" flavor and odor. By "anaerobic conditions" is meant that the incubation of egg liquid with the reducing sugar fermentative activity of a yeast organism is conducted in the absence of oxygen. The anaerobic conditions of this process may be achieved by incubating the egg liquid with the reducing sugar fermentative activity in a submerged state, under nitrogen gas, etc.

Although this process can be carried out under anaerobic conditions, better results from the standpoint of practicality can be obtained with such process under aerobic conditions.

This process can be adapted to large scale manufacture of dry egg products in continuous operation. The degree of glycolysis in an egg inoculum is only indirectly related to the number of yeast organisms therein. Thus the quantity of yeast required to cure a given amount of egg liquid can only be predetermined in a roughly semi-quantitative manner. In the present process the enzymatic potency of the reducing sugar fermenting concentrate can be predetermined by analytical procedures. It is then possible to introduce into the egg liquid a known quantity of reducing sugar fermentative activity, and by interregulating pH, temperature and time obtain uniform glucolysis thereof.

The yeast organisms from which the reducing sugar fermentative activity can be derived are capable of anaerobically converting a reducing sugar into alcohol and carbon dioxide. Thus, the reducing sugar fermentative activity can be derived from non-pathogenic reducing sugar fermenting yeast organisms of the genus Saccharomyces, including such species as *S. pastorianus, S. validus, S. logos, S. fragilis, S. intermedius, S. villianus, S. odessa, S. tubiformis, S. paradoxus* and *S. uvarum*; such species of the genus Cryptococcus as *C. utilis, C. kefyr, C. fermentans, C. Holmii* and *C. sphaericus*; and such species of the genus Candida as *C. tropicalis, C. pseudotropicalis* and *C. guilliermondi*. Although this reducing sugar fermentative activity may be derived from any of these yeast organisms, I have found that better curing of an egg liquid can be achieved with the reducing sugar fermentative activity derived from bakers yeast, *Saccharomyces cerevisiae,* or "top" brewers yeast, a strain of *Saccharomyces carlsbergensis,* and especially desirable results are obtained with the reducing sugar fermentative activity derived from "bottom" brewers yeast, also a strain of *S. carlsbergensis.* By "bottom" yeast is meant a yeast organism that falls to the bottom of the liquid being fermented, while "top" yeast refers to a yeast organism which rises to the top during fermentation. The species *S. cerevisiae,* includes the varieties *ellipsoideus, turbidans, marcalianus, pulmonalis* and *festinans,* while the species *S. carlsbergensis* includes the varieties *monacensis, valdensis, mandshuricusii* and *polymorphus.* The nomenclature source for these yeast organisms is Skinner et al. "Henrici's Molds, Yeast and Actinomycetes," second edition; John Wiley & Sons, Inc. (New York), 1947.

While the reducing sugar fermentative activity utilized in this process should be substantially free from the viable yeast organism, especially desirable curing of an egg liquid can be achieved with reducing sugar fermentative activity substantially free from yeast cells. This reducing sugar fermentative activity may be freed from the viable yeast organism by inhibiting or destroying the yeast organism without impairing such fermentative activity. For example, a yeast culture may be rapidly dried and then heated to a temperature of about 100° C. to destroy the yeast organism without impairing the reducing sugar fermentative activity. On the other hand, the separation of the yeast cells from the reducing sugar fermentative activity may be obtained by such methods as (1) grinding a yeast culture with sand, then adding infusorial earth, and separating the extracellular portion from the cellular portion in a pressing operation; (2) autolyzing a yeast culture in an aqueous solution and then, separating the aqueous extract from the cellular residue by centrifugation or filtration; and (3) dehydrating a yeast culture with an acetone-ether or acetone-alcohol solution, and separating the reducing sugar fermentative activity in the form of a light, fluffy powder from the residual stroma and cellular debris.

Although this reducing sugar fermentative activity can be utilized in the curing of any egg liquid, better results are obtained with a liquid mixture of egg yolks and whites, such as a whole egg mixture. Especially desirable utilization of this reducing sugar fermentative activity can be made in the curing of liquid egg white. The cured egg liquid may be dehydrated by, for example, spray-drying to obtain a dry egg product.

In the preferred practice of this invention a reducing sugar fermenting concentrate can be prepared by autolyzing a "bottom" brewers yeast product in a substantially neutral solution for a period of 16 hours at a temperature of about 25° C. The resulting autolysate can then be centrifuged to separate the cellular residue from the enzyme extract. This enzyme extract can be stored at refrigerator temperature for utilization in the curing of egg products. The glucolytic activity of this enzyme extract can be determined by mixing 5 ml. of a 1% solution of glucose with 2 ml. of the enzyme extract. This mixture can then be incubated for a period of 3 hours at a temperature of 37° C. The presence of glucose in the incubated mixture can then be detected with Fehling's solution in which a negative test indicates the lack of reducing sugar therein and demonstrates the activity of the enzyme extract. The potency of this enzyme extract can be expressed in glucolytic units, wherein one unit is equal to one gram of glucose being removed per hour per ml. of enzyme extract. This reducing sugar fermenting concentrate can then be introduced into, for example, liquid egg white. The resulting egg white mixture can then be incubated for a period of time sufficient to obtain the desired glucolysis. The incubated egg white mixture can then be spray-dried to obtain a dry egg white product. The glucose content of the dry egg white product can be determined by the aforementioned Fehling's test.

This egg curing process, as performed under aerobic conditions, can be further illustrated by the following specific example:

Brewers yeast, in the amount of 20 g. was mixed with 40 ml. of 0.2 M sodium bicarbonate solution. The resulting mixture was autolyzed for a period of 16 hours at room temperature. The autolyzed mixture was centrifuged and the cellular residue thereby obtained in a volume of 10 ml. and such extract was stored at a temperature of 5° C. This extract was mixed with liquid egg white in varying concentrations, and the resulting mixtures incubated for a period of 3 hours at a temperature of 37° C., under aerobic conditions. The incubated mixtures were then stored at room temperature for a period of 16 hours. Thereafter, these mixtures were subjected to heat coagulation, then 10 ml. of hot distilled water was added to each mixture, and the coagulated protein separated by centrifugation. The residual liquid was subjected to analysis for sugar content with Fehling's solution. The results of these analyses were as follows:

| Volume of Liquid Egg White (ml.) | Volume of Yeast Extract (ml.) | Volume of Water Added to the Egg White Extract Mixture (ml.) | Fehling's Reaction |
|---|---|---|---|
| 0 | 1 | 10 | negative. |
| 10 | 2 | 0 | Do. |
| 10 | 1 | 1 | Do. |
| 10 | 1 | 0 | Do. |
| 10 | 0 | 1 | positive. |

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

I claim:

1. The process for preparing an egg product, which comprises contacting an egg liquid with the reducing sugar fermentative activity derived from a yeast organism, said reducing sugar fermentative activity being substantially free from the viable yeast organism, and being active under anaerobic conditions.

2. The process for preparing an egg product, which comprises contacting, under anaerobic conditions, an egg liquid with the reducing sugar fermentative activity of a yeast organism, said reducing sugar fermentative activity being substantially free from the viable yeast organism.

3. The process of claim 2 in which said yeast organism is *Saccharomyces cerevisiae*.

4. The process of claim 2 in which said yeast organism is *Saccharomyces carlsbergensis*.

5. The process of preparing an egg product, which comprises contacting an egg liquid with the reducing sugar fermentative activity of a yeast organism, said reducing sugar fermentative activity being substantially free from yeast cells and being active in the absence of oxygen.

6. The process of claim 5 in which said egg liquid is a liquid mixture of egg yolks and whites.

7. The process of claim 5 in which said egg liquid is liquid egg white.

8. The process of preparing an egg product which comprises incubating an egg liquid with the reducing sugar fermentative activity of a yeast organism, said reducing sugar fermentative activity being substantially free from the viable yeast organism, and being active in the absence of oxygen and drying the incubated egg liquid.

9. The process of preparing an egg product, which comprises incubating liquid egg white with the reducing sugar fermentative activity of a yeast organism of the species *Saccharomyces carlsbergensis* under anaerobic conditions, said reducing sugar fermentative activity being substantially free from yeast cells, and drying the incubated liquid egg white.

References Cited in the file of this patent

UNITED STATES PATENTS

| 2,460,986 | Josh et al. | Feb. 8, 1949 |
| 2,744,017 | Baldwin | May 1, 1956 |
| 2,758,934 | Scott | Aug. 14, 1956 |
| 2,758,935 | Shaffer | Aug. 14, 1956 |

FOREIGN PATENTS

| 681,443 | Great Britain | Oct. 22, 1952 |